(12) United States Patent
Wan et al.

(10) Patent No.: US 9,637,939 B2
(45) Date of Patent: May 2, 2017

(54) CONCRETE DISTRIBUTING APPARATUS, AND VIBRATION SUPPRESSION METHOD, CONTROLLER AND DEVICE FOR THE BOOM THEREOF

(71) Applicant: ZOOMLION HEAVY INDUSTRY SCIENCE AND TECHNOLOGY CO., LTD., Changsha, Hunan (CN)

(72) Inventors: Liang Wan, Changsha (CN); Shiyang Hua, Changsha (CN); Jiaqian Wang, Changsha (CN); Qianxing Luo, Changsha (CN)

(73) Assignee: ZOOMLION HEAVY INDUSTRY SCIENCE AND TECHNOLOGY CO., LTD., Hunan (CN)

( * ) Notice: Subject to any disclaimer, the term of this patent is extended or adjusted under 35 U.S.C. 154(b) by 289 days.

(21) Appl. No.: 14/357,126

(22) PCT Filed: Dec. 7, 2012

(86) PCT No.: PCT/CN2012/086110
§ 371 (c)(1),
(2) Date: May 8, 2014

(87) PCT Pub. No.: WO2014/026454
PCT Pub. Date: Feb. 20, 2014

(65) Prior Publication Data
US 2015/0204090 A1    Jul. 23, 2015

(30) Foreign Application Priority Data

Aug. 17, 2012  (CN) .......................... 2012 1 0294389

(51) Int. Cl.
*F16F 15/00*    (2006.01)
*E04G 21/04*    (2006.01)
(Continued)

(52) U.S. Cl.
CPC ........ *E04G 21/0454* (2013.01); *B66C 13/066* (2013.01); *F16F 15/002* (2013.01); *G05B 15/02* (2013.01); *G05D 19/02* (2013.01)

(58) Field of Classification Search
None
See application file for complete search history.

(56) References Cited

U.S. PATENT DOCUMENTS 4,519,768 A * 5/1985 Murai ..................... E04G 21/04
                                                     137/615
4,969,562 A * 11/1990 Saotome ............... B66C 13/066
                                                     212/238
(Continued)

FOREIGN PATENT DOCUMENTS

CN          1932215 A      3/2007
CN     EP 2067911 A1 *     6/2009 ........... B66C 13/066
(Continued)

OTHER PUBLICATIONS

Office Action issued in corresponding Chinese Patent Application No. 201210294389.6 on Apr. 7, 2013, consisting of 21 pp. (English Translation Provided).
(Continued)

*Primary Examiner* — Isaac T Tecklu
(74) *Attorney, Agent, or Firm* — Volpe and Koenig, P.C.

(57) ABSTRACT

A boom vibration suppression method for concrete distributing apparatus is disclosed. The boom comprises a boom oil cylinder for respectively driving each section of the boom; the vibration suppression method comprises: detecting the variation of output force of the boom oil cylinder, and maintaining the variation of output force within the range of a preset threshold. The present invention further provides a vibration suppression controller, a vibration suppression device, and a concrete distributing apparatus that implement the method described above. The vibration of the boom is (Continued)

controlled directly with little time delay. The pressure of the boom oil cylinder is controlled directly and the variation of output force is maintained within a specific range; that control process is applicable to any boom posture since it has no direct relationship with the posture and dynamic characteristics of the boom.

13 Claims, 2 Drawing Sheets

(51) Int. Cl.
 *B66C 13/06* (2006.01)
 *G05B 15/02* (2006.01)
 *G05D 19/02* (2006.01)

(56) References Cited

U.S. PATENT DOCUMENTS

| | | | | |
|---|---|---|---|---|
| 5,048,296 | A * | 9/1991 | Sunamura | E02F 3/43 60/468 |
| 5,116,188 | A * | 5/1992 | Kurohashi | F16F 9/56 414/685 |
| 5,823,369 | A * | 10/1998 | Kuromoto | B25J 9/1638 212/223 |
| 5,832,730 | A * | 11/1998 | Mizui | B66C 13/066 60/469 |
| 6,328,173 | B1 * | 12/2001 | Wimmer | B66C 13/066 212/261 |
| 2004/0076502 | A1 * | 4/2004 | Nissing | B66C 13/066 414/699 |
| 2006/0272325 | A1 * | 12/2006 | Moon | E02F 9/2207 60/426 |
| 2008/0155977 | A1 * | 7/2008 | Kim | E02F 9/2207 60/420 |
| 2009/0211435 | A1 * | 8/2009 | Yi | B66C 13/066 91/361 |
| 2012/0004816 | A1 * | 1/2012 | Okamura | E02F 9/2207 701/50 |
| 2014/0298784 | A1 * | 10/2014 | Huang | B66C 13/066 60/327 |

FOREIGN PATENT DOCUMENTS

| | | |
|---|---|---|
| CN | 102071809 A | 5/2011 |
| CN | 102108790 A | 6/2011 |
| CN | 102322497 A | 1/2012 |
| CN | 102338191 A | 2/2012 |
| CN | 102797787 A | 11/2012 |
| CN | 202707904 U | 1/2013 |
| CN | 102797787 B | 11/2013 |
| EP | 2067911 A1 | 6/2009 |
| JP | 63-7426 A | 1/1988 |
| JP | 11-343095 | 12/1999 |
| JP | 2000-192660 A | 7/2000 |
| JP | 2009-281299 A | 12/2009 |

OTHER PUBLICATIONS

International Search Report issued in International Patent Application No. PCT/CN2012/086110 on May 2, 2013, consisting of 14 pp.

* cited by examiner

CONCRETE DISTRIBUTING APPARATUS, AND VIBRATION SUPPRESSION METHOD, CONTROLLER AND DEVICE FOR THE BOOM THEREOF

FIELD OF THE INVENTION

The present invention relates to engineering machinery domain, in particular to boom vibration suppression method, controller, and device for concrete distributing apparatus, and a concrete distributing apparatus including the device.

BACKGROUND OF THE INVENTION

Existing concrete distributing apparatuses generate pressure fluctuations when they pump concrete; especially, since these pumping apparatuses usually employ a double-cylinder pumping mode, the pressure fluctuations are more severe at the moment of the two cylinders alternative working. The transfer pipeline and boom will be subject to severe shocks regardless of the pumping mode; therefore, the boom will have vibrations and the end hose will whip; such a phenomenon will not only have adverse effect to the operation of the entire apparatus but also shorten the service life of the boom and even cause accidents.

As for existing boom vibration suppression techniques for concrete distributing apparatuses, for example, in an existing boom vibration suppression method, the information on oil pressure in a boom oil cylinder and/or vibration suppression cylinder is detected, the acquired oil pressure information is sent to a control unit of the vibration suppression cylinder, and the control unit of the vibration suppression cylinder analyzes and processes the information and outputs a control signal. The capacity of a rod cavity and the capacity of a rod-less cavity in the vibration suppression cylinder are controlled and regulated according to the control signal, so that the vibration suppression cylinder produces pulse vibrations, which result in vibrations on the end of the boom, the amplitude of which is smaller than or equal to the amplitude of vibrations on the end of the boom incurred by pumping operation and the phase of which opposite to the phase of vibrations on the end of the boom incurred by pumping operation.

In another existing boom vibration suppression method, the vibrations on the end of the boom and the posture of the boom are detected, the acquired signals are transmitted to a vibration suppression control unit, the vibration suppression control unit analyzes and processes the signal and outputs a control signal to control the piston's position in the boom oil cylinder (i.e., capacity of a rod cavity and capacity of a rod-less cavity in the boom oil cylinder), so that the internal force in the boom produces vibrations having phase opposite to that of original vibrations on the end of the boom.

Though the above-mentioned two existing methods in the prior art employs different control signal acquisition approaches and detect different variables, both of them produce vibrations having phase opposite to that of original vibrations on the end of the boom by changing the capacity of a rod cavity and the capacity of a rod-less cavity in the boom oil cylinder and thereby suppress the original vibrations of the boom. Since such control methods introduce pulse vibrations in opposite phase, they will inevitably increase the stress in the boom system and have adverse effect to the service life of the boom. In addition, in the first method in the prior art, since only a few of variables are detected, the control signal obtained with insufficient information is difficult to adapt to booms in different postures; in other words, the control signal is often applicable to booms in a specific posture only; in case the posture of the boom varies, it will be difficult to obtain a satisfactory control effect with the obtained control signal. The second method in the prior art detects the vibrations on the end of the boom and the posture of the boom directly, and the control signal obtained in that way reflects relatively comprehensive information; however, the algorithm for obtaining the control signal is complex, and the robustness of control is poor because there are too many parameters to consider.

SUMMARY OF THE INVENTION

An object of the present invention is to provide a vibration suppression method, which suppresses boom vibrations by controlling the variation of output force of the boom oil cylinder.

To attain the above object, the present invention provides a boom vibration suppression method for concrete distributing apparatus, wherein, the boom comprises a boom oil cylinder for driving each section of the boom to move; the vibration suppression method comprises:
  detecting the variation of output force of the boom oil cylinder;
  maintaining the variation of output force within the range of a preset threshold.

Preferably, the output force of the boom oil cylinder is detected with a first sensor, and the difference values between the output force at adjacent time points is calculated as the variation of the output force of the boom oil cylinder.

Preferably, the vibration suppression method further comprises:
  detecting the position of the piston in the boom oil cylinder;
  maintaining the piston at a preset position.

Preferably, the position of the piston in the boom oil cylinder is detected with a second sensor.

Preferably, the boom oil cylinder is connected with a vibration suppression control valve, and the output force and the piston's position of the boom oil cylinder are regulated with the vibration suppression control valve.

Another object of the present invention is to provide a boom vibration suppression controller for concrete distributing apparatus, which implements the vibration suppression method described above.

The present invention further provides a boom vibration suppression controller for concrete distributing apparatus, wherein, the boom comprises a boom oil cylinder for respectively driving each section of the boom to move, and the controller comprises an input module, a processing module, and a control module connected in sequence, wherein:
  the input module is designed to acquire output force signal of the boom oil cylinder;
  the processing module is designed to calculate the variation of the output force at adjacent time points based on the acquired output force signal, compare the variation with a preset threshold, generate a force control signal according to the result of comparison, and transmit the force control signal to the control module;
  the control module is designed to control and regulate the output force of the boom oil cylinder according to the force control signal, to maintain the variation of the output force within the range of a preset threshold.

Preferably, the input module is further designed to acquire the position signal of the piston in the boom oil cylinder;

the processing module is further designed to compare the acquired position signal with a preset position, generate a position control signal according to the result of comparison, and transmit the position control signal to the control module;

the control module is further designed to control the position of the piston according to the position control signal, so as to maintain the piston at the preset position.

Another object of the present invention is to provide a boom vibration suppression device for concrete distributing apparatus, which comprises the vibration suppression controller described above.

The present invention further provides a boom vibration suppression device for concrete distributing apparatus, wherein, the boom comprises a boom oil cylinder for respectively driving each section of the boom to move; the vibration suppression device comprises a first sensor designed to detect the output force of the boom oil cylinder and a controller, and the controller comprises an input module, a processing module, and a control module connected in sequence, wherein:

the first sensor is connected to the input module of the controller, and the input module is designed to transmit the output force signal to the processing module;

the processing module is designed to calculate the variation of the output force at adjacent time points based on the acquired output force signal, compare the variation with a preset threshold, generate a force control signal according to the result of comparison, and transmit the force control signal to the control module;

the control module is designed to control and regulate the output force of the boom oil cylinder according to the force control signal, to maintain the variation of the output force within the range of a preset threshold.

Preferably, the vibration suppression device further comprises a second sensor designed to detect the position of the piston in the boom oil cylinder; wherein:

the second sensor is connected to the input module of the controller, and the input module is designed to transmit the position signal to the processing module;

the processing module is further designed to compare the acquired position signal with a preset position, generate a position control signal according to the result of comparison, and transmit the position control signal to the control module;

the control module is further designed to control the position of the piston according to the position control signal, so as to maintain the piston at the preset position.

Preferably, the vibration suppression device further comprises a vibration suppression control valve, which is connected between the control module and the boom oil cylinder and designed to regulate the boom oil cylinder according to the force control signal and the position control signal.

Preferably, the vibration suppression control valve is a hydraulic solenoid valve.

Preferably, the vibration suppression control valve is an electrical proportional reversing valve.

Preferably, the vibration suppression device further comprises a control switch, which controls ON/OFF of the controller.

The present invention further provides a concrete distributing apparatus comprising the vibration suppression device described in this document.

With the technical scheme described above, the output force of the boom oil cylinder is monitored and controlled to suppress the vibrations of the boom. In the present invention, since the variation of output force of the boom oil cylinder is detected to reflect the vibrations on the boom, without the need for considering the influence of the posture and end displacement of the boom, the vibration of the boom is controlled directly and the time delay is short; moreover, the pressure of the boom oil cylinder is controlled directly and the variation of output force is maintained within a specific range; that control process is applicable to any boom posture since it has no direct relationship with the posture and dynamic characteristics of the boom; furthermore, the device that implements the method disclosed in the present invention is simple in structure and is high portability without any modification to the original system.

Other characteristics and advantages of the present invention will be further detailed in the embodiments hereunder.

BRIEF DESCRIPTION OF THE DRAWINGS

The accompanying drawings are provided here to facilitate further understanding on the present invention, and are a part of this document. They are used together with the following embodiments to explain the present invention, but shall not be comprehended as constituting any limitation to the present invention. Among the drawings.

| Brief Description of the reference numbers | |
| --- | --- |
| 1 boom oil cylinder | 2 first sensor |
| 3 second sensor | 4 vibration suppression control valve |
| 5 vibration suppression controller | 6 hydraulic lock |
| 7 control switch | |

DETAILED DESCRIPTION OF THE EMBODIMENTS

Hereunder the embodiments of the present invention will be detailed, with reference to the accompanying drawings. It should be appreciated that the embodiments described here are only provided to describe and explain the present invention, but shall not be deemed as constituting any limitation to the present invention.

In the present invention, unless otherwise specified, the terms that denote directions, such as "top", "bottom", "left", and "right", etc., usually refer to the directions as shown in the drawings, or should be comprehended appropriately in the context.

The present invention provides a boom vibration suppression method for concrete distributing apparatus, wherein, the boom comprises a boom oil cylinder 1 for respectively driving each section of the boom to move; the vibration suppression method comprises:

detecting the variation of output force of the boom oil cylinder 1;

maintaining the variation of output force within the range of a preset threshold.

The technical scheme described above suppresses the vibrations of a boom mainly by controlling the output force of the boom oil cylinder 1. Specifically, when the vibration suppression method disclosed in the present invention is implemented, usually the variation of output force of the boom oil cylinder 1 is detected by a detection device first, and then the variation is compared by a control device with a preset threshold; if the value of the variation is beyond the range of the threshold, the variation will be reduced accordingly by means of appropriate actions, for example, usually the output force of the boom oil cylinder 1 is controlled by means of an actuator (e.g., a control valve).

In the present invention, the vibrations on the boom are reflected by the variation of output force of the boom oil cylinder 1. In addition, the technical scheme for vibration suppression in the present invention doesn't actuate vibrations in phase opposite to the vibrations on the boom to suppression vibrations; instead, it reduces the variation of output force and thereby suppresses the vibrations on the boom from the source.

In the pumping process of a concrete distributing apparatus, the vibrations on the boom will result in variation of output force of the boom oil cylinder 1, and the variation of output force of the boom reflects the vibrations on the boom. Therefore, the idea of vibration suppression in the present invention is to control the variation of output force within a specific range to avoid severe variation of output force and thereby suppress the vibrations on the boom.

Wherein, the variation of output force of the boom oil cylinder 1 can be detected in any appropriate approach in the prior art; for example, the output force of the boom oil cylinder 1 can be detected directly or indirectly, and then the variation of the output force at adjacent time points can be calculated; in addition, the output force of the boom oil cylinder 1 can be regulated in any appropriate approach. These topics will not be detailed further here.

It should be noted that the technical scheme of the present invention aims to monitor the variation of output force instead of the magnitude of the output force of the boom oil cylinder 1, which is to say, the threshold is preset for the variation of output force instead of the output force itself.

With the technical scheme described above, the output force of the boom oil cylinder is monitored and controlled to suppress the vibrations of the boom. In the present invention, since the variation of output force of the boom oil cylinder is detected to reflect the vibrations on the boom, without the need for considering the influence of the posture and end displacement of the boom, the vibration of the boom is controlled directly and the time delay is short; moreover, the pressure of the boom oil cylinder is controlled directly and the variation of output force is maintained within a specific range; that control process is applicable to any boom posture since it has no direct relationship with the posture and dynamic characteristics of the boom; furthermore, the device that implements the method disclosed in the present invention is simple in structure and is high portability without modification to the original system.

Preferably, the output force of the boom oil cylinder 1 is detected with a first sensor 2, and the difference values between the output force at adjacent time points is calculated as the variation of output force of the boom oil cylinder 1.

Since the variable to be measured in the present invention is the variation of output force (i.e., varied amount of output force in unit time) instead of the amplitude of output force, in this preferred embodiment, the output force of the boom oil cylinder 1 is detected with a first sensor 2, and then the difference values between the output force at adjacent time points is calculated to obtain the variation of output force of the boom oil cylinder. Preferably, the first sensor 2 can be a force sensor. A tension sensor or pressure sensor can be selected according to the mounting position and method of the sensor.

Preferably, the vibration suppression method further comprises: detecting the position of the piston in the boom oil cylinder 1; and maintaining the piston at a preset position.

In the operating process of the boom oil cylinder 1, since the area of the rod cavity is different to the area of the rod-less cavity and the load has influence on the displacement of the piston rod in the boom oil cylinder 1, the piston rod in the boom oil cylinder 1 will inevitably has macroscopic extension or retraction action in the process for regulating the output force of the boom oil cylinder 1; consequently, the stable position of the boom will vary, and such variation is referred to as floatation.

In a preferred embodiment of the present invention, by detecting the displacement of the piston rod in the boom oil cylinder 1, the position of the piston rod is corrected in real time to prevent macroscopic floatation of the boom, and thereby suppress vibrations of the boom near the stable position.

Wherein, the preset position is the position of the piston in the boom oil cylinder 1 when the boom is in stable state.

Preferably, the position of the piston in the boom oil cylinder 1 is detected with a second sensor 3.

To maintain the piston in the boom oil cylinder 1 at the preset position without floatation, in a preferred embodiment of the present invention, the position of the piston in the boom oil cylinder 1 is detected with a second sensor 3, and the position of the piston is compared with a preset position (i.e., the position of the piston when the boom is in stable state); if the position of the piston deviates from the preset position, the position of the piston is controlled to maintain the position of the piston at the preset position.

Preferably, the boom oil cylinder 1 is connected with a vibration suppression control valve 4, and the output force and the piston's position of the boom oil cylinder 1 are regulated with the vibration suppression control valve 4.

In the present invention, in order to suppress vibrations on the boom, the output force of the boom oil cylinder 1 should be detected; more preferably, the position of the piston in the boom oil cylinder 1 should be detected; in addition, the results of detection should be compared with corresponding preset values (threshold of output force variation or preset position of piston), and then feedback control should be exercised for the boom oil cylinder 1 according to the result of comparison.

In this preferred embodiment, a vibration suppression control valve 4 is provided, and the vibration suppression control valve 4 is connected to the boom oil cylinder 1 to control the boom oil cylinder 1. Therefore, the vibration suppression control valve 4 can be set appropriately to control the output force of the boom oil cylinder 1 or the output force of the boom oil cylinder 1 and the position of the piston.

Figure 3:
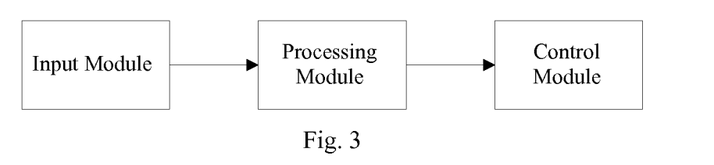
FIG. 3 is a structural schematic view showing the vibration suppression controller in a preferred embodiment of the present invention.

The present invention further provides a boom vibration suppression controller 5 for concrete distributing apparatus, wherein, the boom comprises a boom oil cylinder 1 for respectively driving each section of the boom to move, and the controller 5 comprises an input module, a processing module, and a control module connected in sequence, wherein:

the input module is designed to acquire output force signal of the boom oil cylinder 1;

the processing module is designed to calculate the variation of the output force at adjacent time points based on the acquired output force signal, compare the variation with a preset threshold, generate a force control signal according to the result of comparison, and transmit the force control signal to the control module;

the control module is designed to control and regulate the output force of the boom oil cylinder 1 according to the force control signal, to maintain the variation of output force within the range of a preset threshold.

A controller 5 that implements the method disclosed in the present invention is provided. The technical scheme of the present invention suppresses the vibrations of a boom mainly by controlling the output force of the boom oil cylinder 1. Specifically, when the vibration suppression method disclosed in the present invention is implemented, usually the variation of output force of the boom oil cylinder 1 is detected by a detection device first; then, the output force signal of the boom oil cylinder 1 is acquired by the input module of the controller 5 from the detection device; next, the output force signal is processed by the processing module to obtain the variation of output force; the variation is compared with a preset threshold, a force control signal is generated according to the result of comparison, and the force control signal is transmitted to the control module; and next, the output force of the boom oil cylinder 1 is controlled by the control module within the range of a preset threshold; usually, the control module controls the output force of the boom oil cylinder 1 via an actuator (e.g., a control valve).

In the present invention, the vibrations on the boom are reflected by the variation of output force of the boom oil cylinder 1. In addition, the technical scheme for vibration suppression in the present invention doesn't actuate vibrations in phase opposite to the vibrations on the boom to suppression vibrations; instead, it reduces the vibration energy of the boom and thereby suppresses the vibrations on the boom from the source.

In the pumping process of a concrete distributing apparatus, the vibrations on the boom will result in variation of output force of the boom oil cylinder 1, and the variation of output force of the boom reflects the vibrations on the boom. Therefore, the idea of vibration suppression in the present invention is to control the variation of output force within a specific range to avoid severe variation of output force and thereby suppress the vibrations on the boom.

Wherein, the variation of output force of the boom oil cylinder 1 can be detected in any appropriate approach in the prior art; for example, the output force of the boom oil cylinder 1 can be detected directly or indirectly, and then the variation of the output force at adjacent time points can be calculated; in addition, the output force of the boom oil cylinder 1 can be regulated in any appropriate approach. These topics will not be detailed further here.

It should be noted that the technical scheme of the present invention aims to monitor the variation of output force instead of the magnitude of the output force of the boom oil cylinder 1, which is to say, the threshold is preset for the variation of output force instead of the output force itself.

With the technical scheme described above, the present invention suppresses the vibrations of the boom by monitoring and controlling the output force of the boom oil cylinder. In the present invention, since the variation of output force of the boom oil cylinder is detected to reflect the vibrations on the boom, without the need for considering the influence of the posture and end displacement of the boom, the vibration of the boom is controlled directly and the time delay is short; moreover, the pressure of the boom oil cylinder is controlled directly and the variation of output force is maintained within a specific range; that control process is applicable to any boom posture since it has no direct relationship with the posture and dynamic characteristics of the boom; furthermore, the device that implements the method disclosed in the present invention is simple in structure and is high portability without any modification to the original system.

Preferably, the input module is further designed to acquire the position signal of the piston in the boom oil cylinder 1;

the processing module is further designed to compare the acquired position signal with a preset position, generate a position control signal according to the result of comparison, and transmit the position control signal to the control module;

the control module is further designed to control the position of the piston according to the position control signal, so as to maintain the piston at the preset position.

In the operating process of the boom oil cylinder 1, since the area of the rod cavity is different to the area of the rod-less cavity and the load has influence on the displacement of the piston rod in the boom oil cylinder 1, the piston rod in the boom oil cylinder 1 will inevitably has macroscopic extension or retraction action in the process for regulating the output force of the boom oil cylinder 1; consequently, the stable position of the boom will vary, and such variation is referred to as floatation.

In a preferred embodiment of the present invention, the input module further acquires the position signal of the piston rod in the boom oil cylinder 1, the processing module compares the position of the piston rod with a preset position, and the control module controls the piston rod to stabilize at the preset position; in that way, the position of the piston rod is corrected in real time to prevent macroscopic floatation of the boom, and thereby maintain the stability of the boom and suppress vibrations on the boom.

Wherein, the preset position is the position of the piston in the boom oil cylinder 1 when the boom is in stable state.

Figure 2:
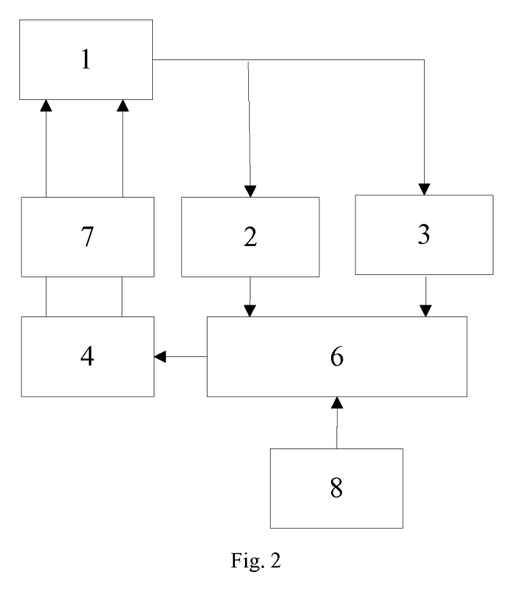
FIG. 2 is a schematic structural view showing the connection between the vibration suppression device and the boom oil cylinder in a preferred embodiment of the present invention.

Preferably, a vibration suppression control valve 4 is connected between the control module and the boom oil cylinder 1, and the vibration suppression control valve 4 regulates the boom oil cylinder 1 according to the force control signal and position control signal.

In the present invention, in order to suppress vibrations on the boom, the input module of the vibration suppression controller 5 should acquire the output force signal of the boom oil cylinder 1; more preferably, the input module should acquire the position signal of the piston in the boom oil cylinder 1; in addition, the processing module should compare the results of detection with corresponding preset values (threshold of output force variation or preset position of piston), and then feedback control should be exercised for the boom oil cylinder 1 by the control module according to the result of comparison.

In the application of the controller provided in the present invention, preferably the boom oil cylinder 1 is controlled via the vibration suppression control valve 4; the vibration suppression control valve 4 is connected between the control module and the boom oil cylinder 1, to control the boom oil cylinder 1 according to the control signal outputted from the control module. Therefore, the vibration suppression control valve 4 can be set appropriately to control the output force of the boom oil cylinder 1 or the output force of the boom oil cylinder 1 and the position of the piston.

The present invention further provides a boom vibration suppression device for concrete distributing apparatus, wherein, the boom comprises a boom oil cylinder 1 for respectively driving each section of the boom to move; the vibration suppression device comprises a first sensor 2 designed to detect the output force of the boom oil cylinder 1 and a controller 5, and the controller 5 comprises an input module, a processing module, and a control module connected in sequence, wherein:

the first sensor 2 is connected to the input module of the controller 5, and the input module is designed to transmit the output force signal to the processing module;

the processing module is designed to calculate the variation of the output force at adjacent time points based on the acquired output force signal, compare the variation with a preset threshold, generate a force control signal according to the result of comparison, and transmit the force control signal to the control module;

the control module is designed to control and regulate the output force of the boom oil cylinder 1 according to the force control signal, to maintain the variation of output force within the range of a preset threshold.

A vibration suppression device that implements the method disclosed in the present invention is provided. The technical scheme of the present invention suppresses the vibrations of a boom mainly by controlling the output force of the boom oil cylinder 1. Specifically, when the vibration suppression method disclosed in the present invention is implemented, usually the variation of output force of the boom oil cylinder 1 is detected by the first sensor 2 first; then, the output force signal of the boom oil cylinder 1 is acquired by the input module of the controller 5 from a detection device; next, the output force signal is processed by the processing module to obtain the variation of output force; the variation is compared with a preset threshold, a force control signal is generated according to the result of comparison, and the force control signal is transmitted to the control module; and last, the output force of the boom oil cylinder 1 is controlled by the control module within the range of a preset threshold; usually, the control module controls the output force of the boom oil cylinder 1 via an actuator (e.g., a control valve).

In the present invention, the vibrations on the boom are reflected by the variation of output force of the boom oil cylinder 1. In addition, the technical scheme for vibration suppression in the present invention doesn't actuate vibrations in phase opposite to the vibrations on the boom to suppression vibrations; instead, it reduces the vibration energy of the boom and thereby suppresses the vibrations on the boom from the source.

In the pumping process of a concrete distributing apparatus, the vibrations on the boom will result in variation of output force of the boom oil cylinder 1, and the variation of output force of the boom reflects the vibrations on the boom. Therefore, the idea of vibration suppression in the present invention is to control the variation of output force within a specific range to avoid severe variation of output force and thereby suppress the vibrations on the boom.

Wherein, the variation of output force of the boom oil cylinder 1 can be detected in any appropriate approach in the prior art; for example, the output force of the boom oil cylinder 1 can be detected directly or indirectly, and then the variation of the output force at adjacent time points can be calculated; in addition, the output force of the boom oil cylinder 1 can be regulated in any appropriate approach. These topics will not be detailed further here.

It should be noted that the technical scheme of the present invention aims to monitor the variation of output force instead of the magnitude of the output force of the boom oil cylinder 1, which is to say, the threshold is preset for the variation of output force instead of the output force itself.

With the technical scheme described above, the present invention suppresses the vibrations of the boom by monitoring and controlling the output force of the boom oil cylinder. In the present invention, since the variation of output force of the boom oil cylinder is detected to reflect the vibrations on the boom, without the need for considering the influence of the posture and end displacement of the boom, the vibration of the boom is controlled directly and the time delay is short; moreover, the pressure of the boom oil cylinder is controlled directly and the variation of output force is maintained within a specific range; that control process is applicable to any boom posture since it has no direct relationship with the posture and dynamic characteristics of the boom; furthermore, the device that implements the method disclosed in the present invention is simple in structure and is high portability without any modification to the original system.

Preferably, the vibration suppression device further comprises a second sensor 3 designed to detect the position of the piston in the boom oil cylinder 1; wherein:

the second sensor 3 is connected to the input module of the controller 5, and the input module is designed to transmit the position signal to the processing module;

the processing module is further designed to compare the acquired position signal with a preset position, generate a position control signal according to the result of comparison, and transmit the position control signal to the control module;

the control module is further designed to control the position of the piston according to the position control signal, so as to maintain the piston at the preset position.

In the operating process of the boom oil cylinder 1, since the area of the rod cavity is different to the area of the rod-less cavity and the load has influence on the displacement of the piston rod in the boom oil cylinder 1, the piston rod in the boom oil cylinder 1 will inevitably has macroscopic extension or retraction action in the process for regulating the output force of the boom oil cylinder 1; consequently, the stable position of the boom will vary, and such variation is referred to as floatation.

In a preferred embodiment of the present invention, the second sensor 3 detects the displacement of the piston rod in the boom oil cylinder 1, the input module of the controller 5 acquires the displacement signal obtained by the second sensor 3, the processing module compares the position of the piston rod with a preset position, and the control module controls the piston rod to stabilize at the preset position; in that way, the position of the piston rod is corrected in real time to prevent any macroscopic floatation of the boom, and thereby maintain the stability of the boom and suppress vibrations on the boom.

Wherein, the preset position is the position of the piston in the boom oil cylinder 1 when the boom is in stable state.

Preferably, the vibration suppression device further comprises a vibration suppression control valve 4, which is connected between the control module and the boom oil cylinder 1 and designed to regulate the boom oil cylinder 1 according to the force control signal and position control signal.

In the present invention, in order to suppress vibrations on the boom, the input module of the vibration suppression controller 5 should acquire the output force signal of the boom oil cylinder 1; more preferably, the input module should acquire the position signal of the piston in the boom oil cylinder 1; in addition, the processing module should compare the results of detection with corresponding preset values (threshold of output force variation or preset position of piston), and then feedback control should be exercised for the boom oil cylinder 1 by the control module according to the result of comparison.

In this preferred embodiment, a vibration suppression control valve 4 is provided, and the vibration suppression control valve 4 is connected between the control module and the boom oil cylinder 1 to control the boom oil cylinder 1 according to the control signal outputted from the control module. Therefore, the vibration suppression control valve 4 can be set appropriately to control the output force of the boom oil cylinder 1 or the output force of the boom oil cylinder 1 and the position of the piston.

Figure 1:
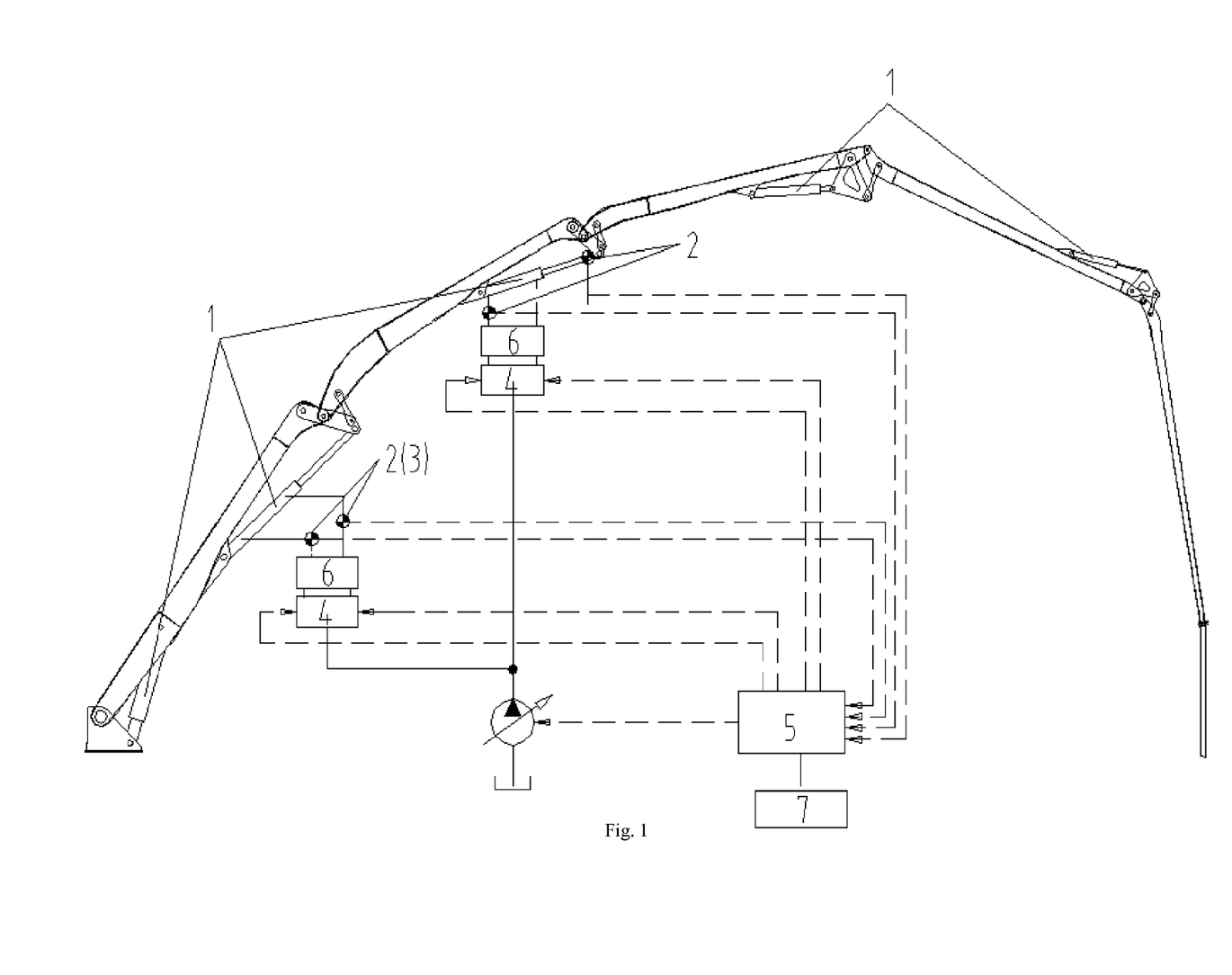
FIG. 1 is a schematic view showing the connection between the vibration suppression device and the bottom of a concrete distributing apparatus in a preferred embodiment of the present invention.

As shown in FIG. 1, in actual applications, in order to ensure the oil circuit being locked reliably when the vibration suppression control is stopped, a hydraulic lock 6 is connected between the vibration suppression control valve 4 and the boom oil cylinder 1, and is designed to control the flow of the hydraulic fluid from the vibration suppression control valve 4 to the boom oil cylinder 1, so as to control the boom oil cylinder 1 accordingly.

In addition, as shown in FIG. 1, the first sensor designed to detect the output force of the boom oil cylinder 1 can be mounted on the piston rod in the boom oil cylinder 1.

Preferably, the vibration suppression control valve 4 is a hydraulic solenoid valve. More preferably, the vibration suppression control valve 4 is an electrical proportional reversing valve.

In engineering machines, hydraulic solenoid valves are usually used as controlling actuators. In the engineering machinery domain, hydraulic devices are usually used to provide driving power, while solenoid valves are usually used to control the flow and direction of hydraulic fluid. In a preferred embodiment of the present invention, an electrical proportional reversing valve is used as the vibration suppression control valve 4; of course, any other hydraulic solenoid valve applicable to the present invention can be used, or the vibration suppression control valve 4 can be any other valve that can implement the desired servo-control function.

It should be noted that the control variable of output force of the boom oil cylinder 1 in the present invention is usually very small, which is to say, the vibration suppression control valve 4 usually exercises fine control for the boom oil cylinder 1. Moreover, since the stroke of the piston in the boom oil cylinder 1 is limited, the regulation amount of the piston's position implemented by the vibration suppression control valve 4 is usually very small. Therefore, the control accuracy should be considered when the vibration suppression control valve 4 is selected. For example, the vibration suppression control valve 4 regulates the opening degree of the valve according to the control signal outputted from the control module, so as to finely tune the output of the vibration suppression control valve 4.

Moreover, the vibration suppression control valve 4 can control the boom oil cylinder 1 directly; alternatively, a vibration suppression control cylinder can be added between the vibration suppression control valve 4 and the boom oil cylinder 1; in that case, the vibration suppression control valve 4 controls the vibration suppression control cylinder, and the vibration suppression control cylinder transfers the control to the boom oil cylinder 1. That is to say, the vibration suppression control valve 4 can employ a direct control method or indirect control method, and the two methods have different characteristics: direct control not only can simplify the vibration suppression device and reduce the cost but also is helpful for installation in the existing systems and has high versatility; however, in some occasions where direct control is inconvenient to use, indirect control can be used; moreover, the two methods can be used in combination, i.e., some boom oil cylinders 1 can be controlled directly with the vibration suppression control valve 4, while other boom oil cylinders 1 can be controlled via the vibration suppression control cylinder under control of the vibration suppression control valve 4.

Furthermore, owing to the fact that a boom consists of multiple sections and each section can has a separate boom oil cylinder 1, the present invention can detect and control all the boom oil cylinders 1 or detect and control some of the boom oil cylinders 1 as required; the vibration suppression controller 5 and the device can be set as required according to the actual situation.

Preferably, the vibration suppression device further comprises a control switch 7, which controls ON/OFF of the controller 5.

Once the vibration suppression device in the present invention is started, the sensors and controller 5 will exercise detection and control continuously and will consume energy persistently. In view of that, in a preferred embodiment of the present invention, the vibration suppression device further comprises a control switch 7. When it is unnecessary to control vibrations on the boom, the control switch 7 can be switched off, so as to stop the vibration suppression device; when it is required to control vibrations on the boom, the control switch 7 can be switched on.

The present invention further provides a concrete distributing apparatus comprising the vibration suppression device described in this document.

While some preferred embodiments of the present invention are described above with reference to the accompanying drawings, the present invention is not limited to the details in those embodiments. Those skilled in the art can make simple modifications and variations to the technical scheme of the present invention, without departing from the spirit of the present invention. However, all these simple modifications and variations shall be deemed as falling into the protected domain of the present invention.

In addition, it should be noted: the specific technical features described in above embodiments can be combined in any appropriate form, provided that there is no conflict. To avoid unnecessary repetition, the possible combinations are not described specifically in the present invention.

Moreover, the different embodiments of the present invention can be combined freely as required, as long as the combinations don't deviate from the ideal and spirit of the present invention. However, such combinations shall also be deemed as falling into the scope disclosed in the present invention.

The invention claimed is:

1. A boom vibration suppression method for concrete distributing apparatus, wherein the apparatus comprises a boom, and the boom comprises a boom oil cylinder for respectively driving each section of the boom to move; the vibration suppression method comprises:

detecting variation of output force of the boom oil cylinder, wherein the difference values between the output force at adjacent time points is calculated as the variation of output force of the boom oil cylinder; and maintaining the variation of output force within the range of a preset threshold.

2. The vibration suppression method according to claim 1, wherein, the output force of the boom oil cylinder is detected with a first sensor.

3. The vibration suppression method according to claim 1, further comprising:
    detecting the position of the piston in the boom oil cylinder; and
    maintaining the piston at a preset position.

4. The vibration suppression method according to claim 3, wherein, the position of the boom oil cylinder is detected with a second sensor.

5. The vibration suppression method according to claim 3, wherein the boom oil cylinder is connected with a vibration suppression control valve, and the vibration suppression control valve is used to regulate the output force and the piston's position of the boom oil cylinder.

6. A boom vibration suppression controller for concrete distributing apparatus, wherein the apparatus comprises a boom, and the boom comprises a boom oil cylinder for respectively driving each section of the boom to move, and the controller comprises an input module, a processing module, and a control module connected in sequence, wherein:
    the input module is designed to acquire output force signal of the boom oil cylinder;
    the processing module is designed to calculate the variation of the output force at adjacent time points based on the acquired output force signal, compare the variation with a preset threshold, generate a force control signal according to the result of comparison, and transmit the force control signal to the control module; and
    the control module is designed to control and regulate the output force of the boom oil cylinder according to the force control signal, to maintain the variation of the output force within the range of a preset threshold.

7. The vibration suppression controller according to claim 6, wherein the input module is further designed to acquire a position signal of the piston in the boom oil cylinder;
    the processing module is further designed to compare the acquired position signal with a preset position, generate a position control signal according to the result of comparison, and transmit the position control signal to the control module; and
    the control module is further designed to control the position of the piston according to the position control signal, so as to maintain the piston at the preset position.

8. A boom vibration suppression device for concrete distributing apparatus, wherein the apparatus comprises a boom, and the boom comprises a boom oil cylinder for respectively driving each section of the boom to move; the vibration suppression device comprises a first sensor designed to detect the output force of the boom oil cylinder and a controller, and the controller comprises an input module, a processing module, and a control module connected in sequence, wherein:
    the first sensor is connected to the input module of the controller, and the input module is designed to transmit the output force signal to the processing module; and
    the processing module is designed to calculate the variation of the output force at adjacent time points based on the acquired output force signal, compare the variation with a preset threshold, generate a force control signal according to the result of comparison, and transmit the force control signal to the control module;
    the control module is designed to control and regulate the output force of the boom oil cylinder according to the force control signal, to maintain the variation of the output force within the range of a preset threshold.

9. The vibration suppression device according to claim 8, further comprising a second sensor, which is designed to detect the position of the piston in the boom oil cylinder, wherein:
    the second sensor is connected to the input module of the controller, and the input module is designed to transmit the position signal to the processing module;
    the processing module is further designed to compare the acquired position signal with a preset position, generate a position control signal according to the result of comparison, and transmit the position control signal to the control module; and
    the control module is further designed to control the position of the piston according to the position control signal, so as to maintain the piston at the preset position.

10. The vibration suppression device according to claim 8, further comprising a vibration suppression control valve, which is connected between the control module and the boom oil cylinder and designed to regulate the boom oil cylinder according to the force control signal and the position control signal.

11. The vibration suppression device according to claim 8, further comprising a control switch, which controls ON/OFF of the controller.

12. The vibration suppression device according to claim 9, further comprising a control switch, which controls ON/OFF of the controller.

13. The vibration suppression device according to claim 9, further comprising a vibration suppression control valve, which is connected between the control module and the boom oil cylinder and designed to regulate the boom oil cylinder according to the force control signal and the position control signal.

* * * * *